United States Patent

Sakaguchi

[11] 3,891,923
[45] June 24, 1975

[54] UNIT FOR ASSEMBLING ELEMENTS OF TAUT BAND SUSPENSION TYPE INDICATING INSTRUMENT

[75] Inventor: Takehiko Sakaguchi, Sakaki-machi, Japan

[73] Assignee: Hioki Electric Works Co., Ltd., Nagano, Japan

[22] Filed: Jan. 16, 1974

[21] Appl. No.: 434,761

[30] Foreign Application Priority Data
Feb. 2, 1973  Japan.............................. 48-13480

[52] U.S. Cl............................. 324/154 R; 29/595
[51] Int. Cl................................................ G01r 1/04
[58] Field of Search............ 29/203 R, 203 P, 203 J, 29/200 P, 200 J, 602, 595; 324/154 R, 154 PB

[56] References Cited
UNITED STATES PATENTS

| | | | |
|---|---|---|---|
| 2,719,264 | 9/1955 | Murray | 324/154 R |
| 3,325,886 | 6/1967 | Olsen | 29/203 R |
| 3,436,070 | 4/1969 | Utley et al. | 29/203 J |
| 3,647,252 | 3/1972 | Nolin et al. | 29/200 P |
| 3,681,692 | 8/1972 | Haas et al. | 324/154 R |

*Primary Examiner*—Carl E. Hall
*Attorney, Agent, or Firm*—Browdy and Neimark

[57] ABSTRACT

A unit for assembling elements of an electrical indicating instrument of the type having a taut band which, serving as a rotating axis of the indicating mechanism, suspends the meter movement and an element of such a unit comprising a pair of spaced metal plates connected to an insulating plate. The metal plates are equipped with terminal plates and leaf springs to support the taut bands. The meter movement is suspended between the metal plates by way of the taut bands. The meter elements thus assembled are then mounted into a yoke, thereby facilitating the assembling process and permitting the taut band system to be fitted into the indicating mechanism of an electrical indicating instrument, even of small dimension, with ease and accuracy.

6 Claims, 7 Drawing Figures

PATENTED JUN 24 1975                                    3,891,923

SHEET  1

PATENTED JUN 24 1975 3,891,923

SHEET 2

UNIT FOR ASSEMBLING ELEMENTS OF TAUT BAND SUSPENSION TYPE INDICATING INSTRUMENT

FIELD OF THE INVENTION

The present invention relates to taut band suspension type indicating instruments such as those described in U.S. application Ser. No. 421,868, filed Dec. 5, 1973, hereby incorporated by reference, and, more particularly, to a meter element assembly plate and a meter element assembly unit using the meter element assembly plate, capable of simplifying the assembling process in the production of taut band suspension type indicating meters.

BACKGROUND OF THE INVENTION

The taut band suspension type indicating meter, such as for electrical measurements, e.g. a direct current indicating meter, is vulnerable to external mechanical shock or vibration; such external effect has often been the cause of displacing the meter movement and cutting the taut band. One solution to this problem has been to support the movable elements in position against displacement by vibration. In the prior art, as shown in FIG. 4, a moving coil $c$ is mounted on a magnet or a core $b$ in a frame $a$ which is constructed integral with a yoke; a taut band $e$ is fitted to the moving coil by way of a boss $d$ and then extended through a cylindrical stopper $f$ at both ends, which is mounted temporarily into the frame on both sides; and the taut band is soldered at $h$ to a leaf spring $g$, leaving a small gap G between the stopper $f$ and the boss $d$.

According to such prior art, however, there have been difficulties in assembling meter elements, particularly for indicating meters of small size, because the stopper $f$ which serves to prevent the movable meter elements from being displaced is spaced so closely to the boss $d$. The smaller the size of the instrument, the more complicated is the assembly process. This has hampered the achievement of higher efficiency in the production of indicating meters, particularly of small size.

SUMMARY OF THE INVENTION

An object of the invention is to overcome the defects of the prior art, such as indicated above.

Another object is to provide assembling units for improved meters which use a taut band as a rotating axis.

Another object of the invention is to provide an arrangement capable of permitting meter elements to be assembled independently with ease and accuracy without using a conventional stopper.

The other objects, features and advantages of the present invention will become apparent from the following detailed description of an embodiment in conjunction with the accompanying drawing, wherein:

Description of the Preferred Embodiment

Figure 1A:
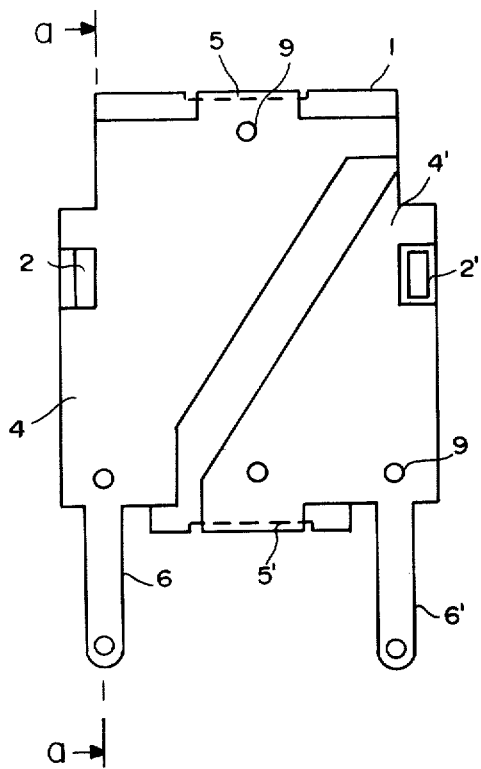
FIGS. 1A is a plan view, 1B a sectional view taken across a—a of 1A and 1C an elevational view showing a meter element assembling plate embodying the present invention.
Figure 1B:
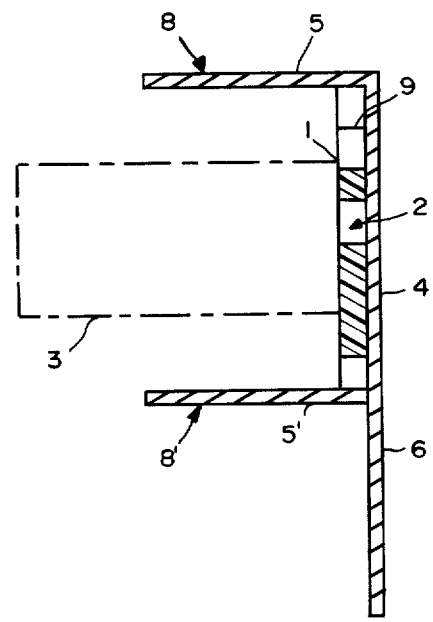
FIG. 1D is a plan view similar to FIG. 1A at an earlier stage in the production thereof.
Figure 1C:
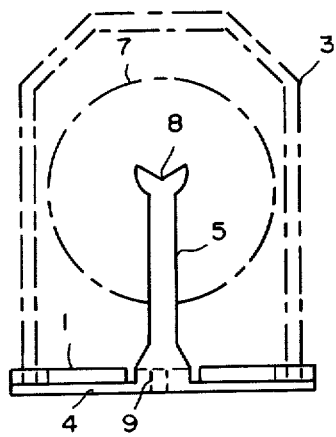
Figure 1D:
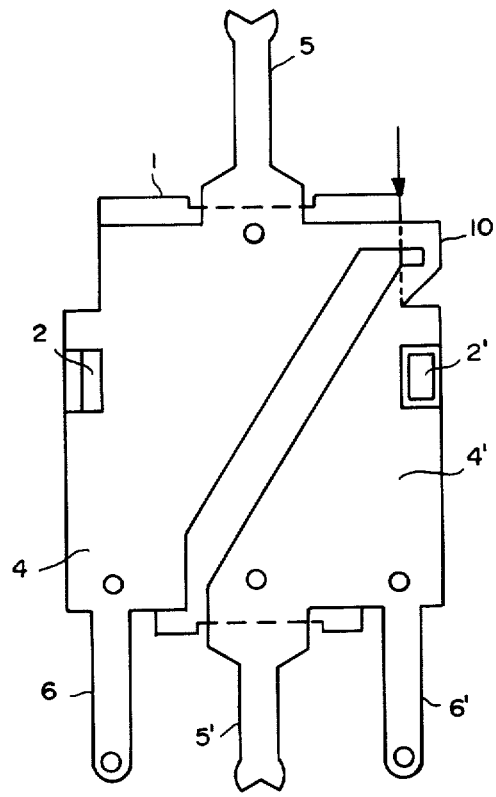
Figure 2:
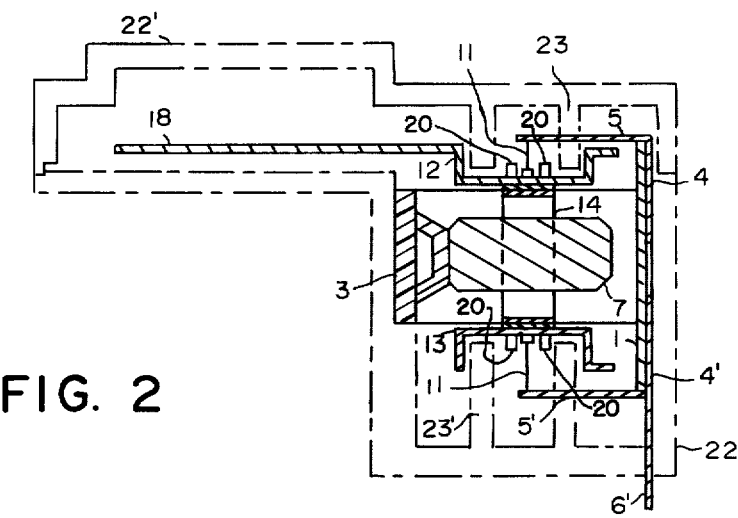
FIG. 2 is a sectional view showing an assembled taut band indicating meter unit using the assembling plate shown in FIG. 1.

Referring to FIG. 1, there is shown an insulating plate 1 made, for example, of any suitable plastic material from which insulating plates are normally made, apertures 2 and 2' into which the open edges of a yoke 3 are fitted, a pair of metal plates 4 and 4' of any suitable non-magnetic material, such as phosphor bronze or nickel silver fastened to the insulating plate 1 and being suitably spaced from each other, taut band suspending leaf springs 5 and 5' formed integrally with the metal plates 4 and 4' respectively, and terminal plates 6 and 6' formed integrally with the metal plates 4 and 4' respectively. The leaf springs 5 and 5' are raised from the edges of the insulating plate 1 at opposite ends on the center line thereof, and extended into the space on both sides of a magnet 7. When the yoke 3 is installed, this magnet 7 is to be located in its center. The line between taut band suspension points 8 and 8' at the tip ends of the leaf springs 5 and 5' is aligned with the longitudinal axis of the magnet 7. The terminal plates 6 and 6' are extended straight from the rear edge of the insulating plate. A plurality of tacks 9 fastens the metal plates 4 and 4' to the insulating plate. More specifically, as shown in FIG. 1D, the metal plates 4 and 4' are initially linked in unity by way of a linking portion 10, thus leaf springs 5, terminal plates 6 and metal plates are constructed originally in a single unit and of a single material. This linkage is then cut away in the arrow-marked direction after the unit of these metal plates 4 and 4' is secured to the insulating plate 1, with the taut band suspending leaf springs 5 and 5' located in position. This arrangement will enable easy and accurate setting of the metal plates on the insulating plate. The shapes of the metal plates 4 and 4' should be such that at least one of the two metal plates remains apart from the yoke 3 when the ends of the yoke are fitted into the apertures 2 and 2'.

Figure 3:
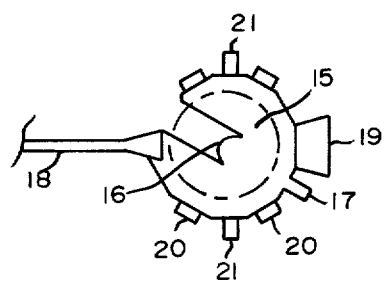
FIG. 3 is a plan view showing a taut band supporting plate of the invention.
Figure 4:
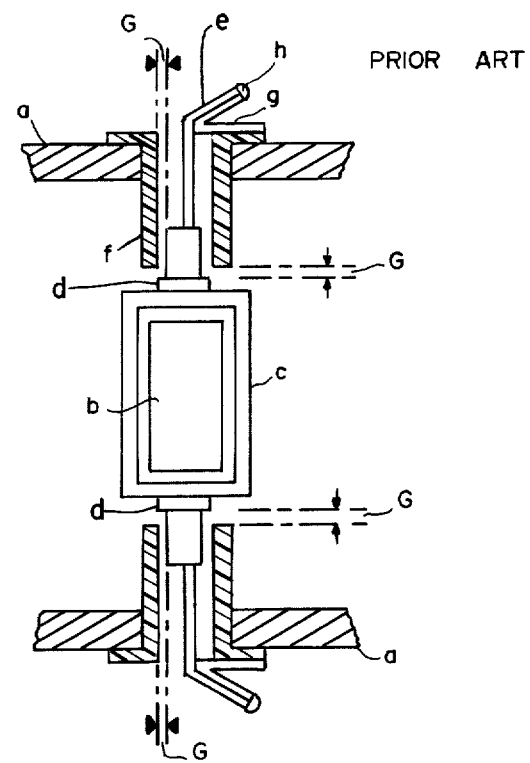
FIG. 4 is a sectional view showing a conventional prior art arrangement for assembling meter elements.

In the next process, a taut band supporting plate 12 equipped with a pointer 18, in the center of which a taut band 11 is fastened, and another taut band supporting plate 13 having no pointer corresponding to pointer 18, are fastened concentrically to a moving coil 14. The fastening of these plates 12 and 13 is accomplished by the use of any suitable insulating paper or the like. As shown in FIG. 3, the taut band supporting plate comprises a taut band supporting member 16 disposed in the center part of a base 15 with a part removed, a taut band fitting arm 17 extended from the base opposite to the supporting member 16, a pointer 18 and a balance arm 19 extended from the base edge, a plurality of small lugs 20 raised from the base edge, and an arm 21 for attachment to a terminal coil lead. The small lugs 20, the pointer support arm, and the balance arm 19 are disposed on a circumference centering the taut band supporting member 16.

Then, in the next process, the ends of the moving coil 14 are connected to the arms 21 of the supporting plates 12 and 13. The free ends of the taut bands 11, having one end supported by the taut band supporting plates 12 and 13, are also supported by the leaf springs 5 and 5' raised from the insulating plate 1, with a suitable tension given to the taut bands. The magnet 7 is inserted in the moving coil 14 and, in parallel, the yoke 3 is mounted on the insulating plate 1. Thus a meter element assembling unit is constituted as an independent body comprising a meter element assembling plate P having a pair of metal plates 4 and 4' fastened to the insulating plate 1 which is coupled to the yoke 3. The metal plates 4 and 4' are integral with the taut band suspending leaf springs 5 and 5' and the terminal plates 6 and 6', respectively. The taut band 11 is suspended between the taut band supporting plates 12 and 13 fastened to the moving coil 14 on both sides.

This assembly unit is mounted into a casing comprising case members 22 and 22' which are equipped with cylindrical members 23 and 23' projected inward and opposite to each other, leaving a small gap g between the surfaces of the taut band supporting plates 12 and 13 and respectively members 23 and 23' and between the lugs 20 and members 23, 23'. Thus, the assembly unit serves to prevent the meter movement from being displaced.

The invention has been described in connection with an indicating meter of internal magnetic type. Clearly, the invention is similarly applicable to an indicating meter of external magnetic type.

This invention, as has been described above, has made it possible to eliminate components corresponding to the conventional stopper f for assembling meter elements. This contributes to the reduction in the number of parts used in the process for assembling meter elements. Furthermore, the assembling parts can be precisely manufactured to design standards. The meter movement displacement-preventive mechanism, which has hitherto required complicated assembling process, can be easily and accurately constructed separately from other meter element assembling processes, and later mounted into an assembly unit which has been separately fabricated. At the same time, the wiring is simplified since that taut band suspending leaf springs are formed integral with the terminal plate on the insulating plate. Therefore, the invention is particularly useful when applied to small-size indicating meters manufactured on a mass production basis.

While one specific embodiment of the invention has been illustrated and described in detail, it is to be understood that the scope of the invention is not limitted thereto or thereby.

What is claimed is:

1. A meter element assembling plate for taut band suspension type electrical indicating instruments comprising:
   an insulating plate having apertures therein for coupling with other elements of the instrument;
   a pair of metal plates fastened to said insulating plate in a spaced relation to one another;
   a taut band suspending leaf spring connected to each of said metal plates; and
   a terminal plate connected to each of said metal plates and extending outwardly therefrom.

2. An assembling plate in accordance with claim 1 wherein said metal plates are disposed on the same side of said insulating plate.

3. An assembling plate in accordance with claim 1 wherein one of said leaf springs extends from one end of said insulating plate and the other of said leaf springs extends from the other end of said insulating plate opposite said first leaf spring.

4. An assembling plate in accordance with claim 1 wherein both of said terminal plates extend in the same direction from one end of said insulating plate.

5. An assembling plate in accordance with claim 1 wherein one of said leaf springs and one of said terminal plates are integral with one of said metal plates, and the other of said leaf springs and the other of said terminal plates are integral with the other of said metal plates.

6. A meter element assembling unit for taut band suspension type electrical indicating instruments including the assembling plate of claim 1 comprising:
   said assembling plate;
   a yoke, open at one end, connected to the apertures of said insulating plate at the open end thereof;
   a movable coil;
   two taut band supporting plates, each of said plates connected to a respective end of said coil, one of said supporting plates having a pointer thereon; and
   a taut band connecting each of said leaf springs with one of said taut band supporting plates so as to suspend said supporting plates and said movable coil within said yoke.

* * * * *